United States Patent
Irie et al.

(10) Patent No.: US 12,037,502 B2
(45) Date of Patent: Jul. 16, 2024

(54) INK-JET INK

(71) Applicant: UNION CHEMICAR CO., LTD., Osaka (JP)

(72) Inventors: Haruyasu Irie, Osaka (JP); Misao Nakamura, Osaka (JP); Masahiro Ichinose, Osaka (JP); Tomoaki Kawahara, Osaka (JP)

(73) Assignee: UNION CHEMICAR CO., LTD., Osaka (JP)

( * ) Notice: Subject to any disclaimer, the term of this patent is extended or adjusted under 35 U.S.C. 154(b) by 92 days.

(21) Appl. No.: 17/792,523

(22) PCT Filed: Jan. 14, 2021

(86) PCT No.: PCT/JP2021/001052
§ 371 (c)(1),
(2) Date: Jul. 13, 2022

(87) PCT Pub. No.: WO2021/145377
PCT Pub. Date: Jul. 22, 2021

(65) Prior Publication Data
US 2023/0057536 A1 Feb. 23, 2023

(30) Foreign Application Priority Data

Jan. 17, 2020 (JP) .................. 2020-005871

(51) Int. Cl.
*C09D 11/38* (2014.01)
*B41J 2/01* (2006.01)
*C09D 11/328* (2014.01)
*C09D 11/36* (2014.01)

(52) U.S. Cl.
CPC ............ *C09D 11/36* (2013.01); *C09D 11/328* (2013.01); *C09D 11/38* (2013.01); *B41J 2/01* (2013.01)

(58) Field of Classification Search
CPC ....... C09D 11/36; C09D 11/328; C09D 11/38; B41J 2/01
See application file for complete search history.

(56) References Cited

U.S. PATENT DOCUMENTS

| 6,869,986 B1 | 3/2005 | Millot et al. |
| 2007/0248838 A1 | 10/2007 | De Saint-Romain |
| 2017/0190926 A1* | 7/2017 | De Saint-Romain ........ B41M 5/506 |

FOREIGN PATENT DOCUMENTS

| JP | 6-3063 16 | 11/1994 | |
| JP | 2005-187745 | 7/2005 | |
| JP | 2010-264599 | 11/2010 | |
| JP | 2015-523435 | 8/2015 | |
| JP | 5758015 | 8/2015 | |
| WO | 2012/121700 | 9/2012 | |
| WO | 2013/189746 | 12/2013 | |
| WO | WO-2013189746 A1 * | 12/2013 | ........ C09D 11/033 |
| WO | 2015/115235 | 8/2015 | |

OTHER PUBLICATIONS

Office Action issued May 9, 2023 in corresponding Chinese Patent Application No. 202180009348.5, with machine translation.
Li Lu Hai, "Printing Ink Colorant", Printing Industry Press, 1st edition, Nov. 2008, pp. 250-251, with English translation.
Office Action issued Jun. 6, 2023 in the Great Britain Patent Application No. 2211855.8.
International Preliminary Report on Patentability issued Jul. 19, 2022 in corresponding International (PCT) Application No. PCT/JP2021/001052, with English translation.
International Search Report issued Apr. 6, 2021 in International (PCT) Application No. PCT/JP2021/001052.

* cited by examiner

*Primary Examiner* — Yaovi M Ameh
(74) *Attorney, Agent, or Firm* — Wenderoth, Lind & Ponack, L.L.P.

(57) ABSTRACT

An object is to provide an ink-jet ink satisfying rapid-drying properties, long decap time, and intermittent long-run printability. The object can be achieved by an ink-jet ink comprising an organic solvent, a surfactant, and a coloring material, wherein the organic solvent contains 1,3-dioxolane.

5 Claims, No Drawings

INK-JET INK

TECHNICAL FIELD

The present invention relates to an ink-jet ink.

BACKGROUND ART

Water-based inks, UV-curable inks, and solvent-based inks are mainly used as ink-jet inks. Of these, solvent-based inks are preferred because water-based inks have a problem of long drying time, and UV-curable inks are less economical.

As a solvent-based ink, Patent Literature 1, for example, discloses an ink comprising a soluble dye, 0.1 to 1 wt % of the ink of a functionalized perfluoropolyether containing at least one alkyl amide functional group, and at least one solvent selected from the group consisting of monovalent short chain alcohols, acetone, ethyl acetate, methyl acetate, 1-methoxy-2-propanol, and diethylene glycol butyl ether.

CITATION LIST

Patent Literature

PTL 1: U.S. Pat. No. 5,758,015

SUMMARY OF INVENTION

Technical Problem

Ink-jet inks are required to have rapid-drying properties; however, rapid-drying inks have a short time (decap time) in which ink is kept as fluid with the printhead being uncapped (with a nozzle opening portion exposed to air), and it is difficult to achieve both rapid-drying properties and long decap time. Moreover, in addition to these characteristics, it is even more difficult to satisfy intermittent long-run printability. Even a solvent-based ink, such as one described in Patent Literature 1, has room for further improvement in order to fully satisfy properties including rapid-drying properties, long decap time, and intermittent long-run printability.

Accordingly, a main object of the present invention is to provide an ink-jet ink that fully satisfies properties including rapid-drying properties, long decap time, and intermittent long-run printability.

Solution to Problem

The present inventors conducted extensive research to solve the above problems, and found that when at least 1,3-dioxolane is used as an organic solvent in an ink-jet ink comprising an organic solvent, a surfactant, and a coloring material, it is possible to obtain an ink-jet ink fully satisfying properties including rapid-drying properties, long decap time, and intermittent long-run printability. The present invention was accomplished s a result of further research based on the above findings.

The present invention encompasses the following embodiments.

Item 1 An ink-jet ink comprising an organic solvent, a surfactant, and a coloring material, wherein the organic solvent contains 1,3-dioxolane.

Item 2 The ink-jet ink according to Item 1, wherein the organic solvent further contains methyl ethyl ketone.

Item 3 The ink-jet ink according to Item 2, wherein the mass ratio of 1,3-dioxolane to methyl ethyl ketone is 20:80 to 80:20.

Item 4 The ink-jet ink according to any one of Items 1 to 3, wherein the surfactant is a nonionic surfactant.

Item 5 The ink-jet ink according to any one of Items 1 to 4, wherein the content of the surfactant is 0.1 to 2 parts by mass based on 100 parts by mass of the organic solvent.

Item 6 The ink-jet ink according to any one of Items 1 to 5, wherein the coloring material is a metal-containing dye.

Item 7 The ink-jet ink according to any one of Items 1 to 6, wherein the content of the coloring material is 1 to 20 parts by mass based on 100 parts by mass of the organic solvent.

Advantageous Effects of Invention

The present invention can, for example, provide an ink-jet ink that fully satisfies properties including rapid drying properties, long decap time, and intermittent long-run printability.

DESCRIPTION OF EMBODIMENTS

In this specification, the "ink-jet ink" means an ink for use in ink-jet printing or an ink that is suitable for ink-jet printing.

The ink-jet ink of the present invention comprises an organic solvent, a surfactant, and a coloring material.

The organic solvent can disperse or dissolve a surfactant or a coloring material. The organic solvent is preferably a solvent that dissolves a surfactant and a coloring material.

The organic solvent contains 1,3-dioxolane. The content of 1,3-dioxolane in the organic solvent is not particularly limited. It is, for example, 5 mass % or more, preferably 10 mass % or more, and even more preferably 15 mass % or more. The higher the content of 1,3-dioxolane is, the longer the decap time tends to become.

The organic solvent may additionally contain one or more other solvents. Examples of the one or more other solvents include alcohols, chain ethers, ketones, and esters. The other solvents can be used alone or in a combination of two or more. Of the other solvents, ketones are preferred, and methyl ethyl ketone is even more preferred. In one embodiment, it is preferable that the organic solvent substantially consists of 1,3-dioxolane and methyl ethyl ketone alone.

The mass ratio of 1,3-dioxolane to methyl ethyl ketone is not particularly limited. It is, for example, 20:80 to 80:20, preferably 30:70 to 70:30, more preferably 40:60 to 70:30, and even more preferably 50:50 to 70:30. The higher the methyl ethyl ketone content is, the more the rapid-drying properties tend to be achieved. When the mass ratio of 1,3-dioxolane to methyl ethyl ketone is in the above range, not only are both the rapid-drying properties and long decap time attained, but also excellent intermittent long-run printability can be attained.

The boiling point of the organic solvent at ordinary pressure (1013 hPa) is not particularly limited as long as the ink-jet ink has rapid-drying properties. It is, for example, 90° C. or less, preferably 85° C. or less, more preferably 80° C. or less, and usually 50° C. or more.

The vapor pressure of the organic solvent at 25° C. is not particularly limited as long as the ink-jet ink has rapid-drying properties. It is, for example, 85 hPa or more, preferably 90 hPa or more, more preferably 95 hPa or more, and usually 200 hPa or less.

The surface tension of the organic solvent at 25° C. is not particularly limited as long as the ink-jet ink has rapid-drying properties. It is, for example, 20 mN/m or more, preferably 25 mN/m or more, and usually 70 mN/m or less.

The content of the organic solvent in the ink-jet ink is not particularly limited. It is, for example, 70 mass % or more, preferably 75 mass % or more, and usually 90 mass % or less.

The surfactant can contribute to not only the formation of droplets and wetting and spreading after the landing of the droplets, but also the extension of decap time and improvement of intermittent long-run printability. Examples of the surfactant include anionic, cationic, nonionic, and amphoteric surfactants.

Examples of anionic surfactants include carboxylates, sulfonates, sulfates, and phosphates. Examples of carboxylates include fatty acid salts, alkyl ether carboxylates, acyl lactates, N-acyl sarcosine salts, and N-acyl methyl taurine salts. Specific examples of sulfonates include alkane sulfonates and α-olefin sulfonates. Examples of sulfates include alkyl sulfate salts, alkyl ether sulfate salts, and monoacylglycerol sulfate salts. Examples of phosphates include alkyl phosphate salts.

Examples of cationic surfactants include amine salts and quaternary ammonium salts. Examples of amine salts include alkylamine salts and fatty acid amide amine salts. Examples of quaternary ammonium salts include alkyl quaternary ammonium salts; and cyclic quaternary ammonium salts, such as benzalkonium-type quaternary ammonium salts, benzethonium chloride, and alkyl pyridinium salts.

Examples of nonionic surfactants include polyoxyethylene nonionic surfactants, polyhydric alcohol fatty acid ester nonionic surfactants, and nitrogen-containing nonionic surfactants. Examples of polyoxyethylene nonionic surfactants include polyoxyethylene alkyl ethers, polyoxyethylene alkyl phenyl ethers, polyoxyethylene polyoxypropylene alkyl ethers, polyoxyethylene fatty acid esters, polyoxyethylene sorbitan fatty acid esters, polyoxyethylene castor oil, polyoxyethylene cured castor oil, and polyoxyethylene alkanoate. Examples of polyhydric alcohol fatty acid esters include propylene glycol fatty acid esters, glycerol fatty acid esters, sorbitan fatty acid esters, and sucrose fatty acid esters. Examples of nitrogen-containing nonionic surfactants include alkyl dialkanolamides, alkylamine oxides, and alkylsulphonamides.

Examples of amphoteric surfactants include amino acid-type amphoteric surfactants, such as glycine-type and aminopropionic-type amphoteric surfactants; betaine-type amphoteric surfactants, such as amino acetate betaine-type and sulfobetaine-type amphoteric surfactants; and phosphoric acid-type amphoteric surfactants.

Anionic, cationic, nonionic, and amphoteric surfactants may be fluoro-containing surfactants. For example, perfluoroalkyl group-containing surfactants are preferred. Of these, fluorine-containing nonionic surfactants are preferred, and examples include perfluoroalkylsulfonamides (e.g., N-ethyl-N-(2-hydroxyethyl)perfluorooctylsulfonamide), perfluoroalkylamine oxides, and perfluoropolyoxyethylene alkyl ethers. At least one end group [—OR (wherein R is a hydrogen atom or an alkyl group)] of the perfluoropolyoxyethylene alkyl ether may be replaced by, for example, —OC(=O)Q (wherein Q is an alkyl group), —O—C(=O) $NZ_2$ (wherein z is a hydrogen atom or an alkyl group).

The surfactants can be used alone or in a combination of two or more. Nonionic surfactants are preferred as a surfactant.

The content of the surfactant is not particularly limited, and is, for example, 0.1 parts by mass or more, preferably 0.2 parts by mass or more, more preferably 0.3 parts by mass or more, even more preferably 0.4 parts by mass or more, and particularly preferably 0.5 parts by mass or more; and for example, 2 parts by mass or less, preferably 1.5 parts by mass or less, and even more preferably 1 part by mass or less, based on 100 parts by mass of the organic solvent. The higher the content of the surfactant is, the longer the decap time and the higher the intermittent long-run printability tends to become. The lower the content of the surfactant is, the higher the rapid-drying properties tend to become.

The coloring material can be suitably selected according to the print design and the like. Examples of the coloring material include pigments and dyes.

As a pigment, both inorganic and organic pigments can be used. Examples of inorganic pigments include titanium oxide, iron oxide, and carbon black. Examples of organic pigments include azo pigments, polycyclic pigments, and rake pigments. Examples of azo pigments include insoluble azo pigments, benzimidazolone pigments, β-naphthol pigments, naphthol AS pigments, and azo condensation pigments. Examples of polycyclic pigments include phthalocyanine pigments, azomethine pigments, quinacridone pigments, perylene pigments, perinone pigments, isoindolinone pigments, isoindoline pigments, dioxazine pigments, thioindigo pigments, anthraquinone pigments, quinophthalone pigments, metal complex pigments, and diketopyrrolopyrrole pigments.

Examples of pigments used for each color are as follows.
Red or Magenta:
 C.I. pigment red-2, 3, 5, 57:1, 112, 122, 144, 149, 166, 168, 177, 178, 184, 202, 254, etc.
Violet:
 C.I. pigment violet-19, 23, 37, etc.
Yellow:
 C.I. pigment yellow-74, 75, 83, 93, 95, 97, 98, 109, 110, 128, 138, 147, 150, 151, 154, 155, 180, 185, etc.
Blue or Cyan:
 C.I. pigment blue-15:1, 15:2, 15:3, 15:4, 16, 22, 60, etc.
Green:
 C.I. pigment green-7, 37, etc.
Black:
 C.I. pigment black-1, 6, 7, etc.

Examples of dyes include acid dyes, basic dyes, direct dyes, reactive dyes, disperse dyes, and metal-containing dyes.

Examples of dyes used for each color are as follows.
Red or Magenta:
 C.I. solvent red-8, 24, 25, 49, 91, 122, 127, 146, 149, 172, 196, 227, 312, etc.
Violet:
 C.I. solvent violet-8, 13, 26, 31, 36, 49, 51, etc.
Yellow:
 C.I. solvent yellow-2, 21, 43, 56, 79, 85, 93, 114, 131, 151, 160, 163, 176, 185, etc.
Blue or Cyan:
 C.I. solvent blue-4, 35, 38, 45, 59, 63, 70, 78, 83, 101, 104, 111, etc.
Green:
 C.I. solvent green-3, 5, 7, 28, etc.
Black:
 C.I. solvent black-5, 7, 27, 29, 34, etc.

The coloring materials can be used alone or in a combination of two or more. The coloring material is preferably a dye, and more preferably a metal-containing dye.

The content of the coloring material is not particularly limited, and it is, for example, 1 part by mass or more, and preferably 5 parts by mass or more; and 20 parts by mass or less, and preferably 15 parts by mass or less, based on 100 parts by mass of the organic solvent.

The ink-jet ink may contain one or more other additives in addition to the organic solvent, surfactant, and coloring material. Examples of the one or more other additives include resins, plasticizers, UV absorbers, light stabilizers, antioxidants, hydrolysis inhibitors, and leveling agents. The other additives can be used alone or in a combination of two or more.

Of the other additives, resins are preferred to improve fixation properties. Examples of resins include styrene acryl-based resins, styrene-maleic acid resins, epoxy resins, phenolic resins, terpene phenolic resins, rosin-based resins, rosin ester-based resins, acryl-based resins, polyamide resins, and butyral resins. The resins can be used alone or in a combination of two or more.

The content of the one or more other additives is not particularly limited, and it is, for example, 0.5 parts by mass or more and preferably 1 part by mass or more; and 10 parts by mass or less, or preferably 5 parts by mass or less, based on 100 parts by mass of an organic solvent.

The ink-jet ink of the present invention may be in a form that is introduced into an ink cartridge.

The ink-jet ink of the present invention can be printed on any object by using an ink-jet printer, especially on a substrate non-absorbent to ink (or non-porous substrate), and an article with an uneven or curved surface. Examples of the material non-absorbent to ink include plastics such as acryl, polyethylene terephthalate (PET), polyvinyl chloride, polycarbonate, and polyolefin; metals such as copper, aluminum, and stainless steel; and glass. Examples of an article with an uneven or curved surface include electronic components, food packaging films, steel cans, bottles, and tubes.

EXAMPLES

The present invention is described in detail below by means of Examples; however, it is not limited to the Examples.

Ink-jet ink evaluation method Physical properties (1) to (3) below were evaluated as follows by using a small thermal ink-jet printer specialized for marking and coding. Specifically, evaluation images were printed on a specific medium to be printed that moves at a transport speed of 15 m/min at a resolution of 300 dpi×300 dpi using inks produced in the Examples and Comparative Examples.

(1) Rapid-Drying Properties

A solid color was printed on a PET film. Rapid-drying properties were evaluated based on the following criteria.

○: Ink is not adhered to a waste cloth even when the printed portion is rubbed with the waste cloth five seconds after printing.

Δ: Ink is adhered to a waste cloth when the printed portion is rubbed with the waste cloth five seconds after printing; however, ink is not adhered to a waste cloth when the printed portion is rubbed with the waste cloth 10 seconds after printing.

x: Ink is adhered to a waste cloth when the printed portion is rubbed with the waste cloth 10 seconds after printing (2) Decap Time A nozzle check pattern image ejected from all nozzles was printed on plain paper copy (PPC) paper, and then the nozzles were allowed to stand and exposed to air without wiping or protecting them. 60 minutes later, the nozzle check pattern image was printed again, and whether the ink was ejected normally from the nozzles was observed. The decap time was evaluated based on the following criteria.

○: No non-ejection nozzles.

Δ: The number of non-ejection nozzles is less than 5 out of 300.

X: The number of non-ejection nozzles is 5 or more out of 300.

(3) Intermittent Long-Run Printability

Evaluation was conducted to determine whether it was possible to intermittently eject ink contained in one cartridge to the end by performing ejection 2000 consecutive times for a specific image and a 15-second break, again ejection 2000 consecutive times and a 15-second break, and so on. In practice, printing was not always conducted 2000 times; ink was ejected into a cup, and after a 15-second break, printing was performed one time on PPC paper, which was observed and evaluated according to the following criteria. There is a difference in that printing is performed on PPC paper or ink is ejected into a cup without printing, and both are the same in that the ink is ejected from nozzles.

○: There are no non-ejection nozzles, and the landing position is not displaced.

Δ: The number of non-ejection nozzles is less than 5 out of 300, or there are no non-ejection nozzles; however, the landing position is displaced.

X: The number of non-ejection nozzles is 5 or more out of 300.

Production Method of Ink-Jet Ink

A metal-containing dye, a fluorine-containing nonionic surfactant, and an organic solvent were fully stirred and mixed using a stirrer, and filtered through a 1-μm membrane filter to obtain ink compositions with formulations shown in Tables 1 and 2.

The results are shown in Tables 1 and 2. The ink formulations in the tables are based on parts by mass.

TABLE 1

|  | Comp. Ex. 1 | Ex. 1 | Comp. Ex. 2 | Comp. Ex. 3 | Ex. 2 | Ex. 3 | Ex. 4 | Ex. 5 | Ex. 6 |
| --- | --- | --- | --- | --- | --- | --- | --- | --- | --- |
| Metal-containing dye | 8 | 8 | 8 | 8 | 8 | 8 | 8 | 8 | 8 |
| Fluorine-containing nonionic surfactant | 1.5 | 1.5 | 1.5 | 1.5 | 1.5 | 1.5 | 1.5 | 1.5 | 1.5 |
| MEK | 100 | — | — | — | 80 | 70 | 60 | 50 | 40 |
| 1,3-Dioxolane | — | 100 | — | — | 20 | 30 | 40 | 50 | 60 |
| Ethanol | — | — | 100 | — | — | — | — | — | — |

TABLE 1-continued

|  | Comp. Ex. 1 | Ex. 1 | Comp. Ex. 2 | Comp. Ex. 3 | Ex. 2 | Ex. 3 | Ex. 4 | Ex. 5 | Ex. 6 |
|---|---|---|---|---|---|---|---|---|---|
| Acetone | — | — | — | 100 | — | — | — | — | — |
| Rapid-drying properties | ○ | Δ | Δ | Δ | ○ | ○ | ○ | ○ | ○ |
| Decap time | X | ○ | ○ | Δ | Δ | ○ | ○ | ○ | ○ |
| Intermittent long-run printability | Δ | Δ | X | Δ | Δ | Δ | Δ | ○ | ○ |

TABLE 2

|  | Ex. 7 | Ex. 8 | Comp. Ex. 4 | Ex. 9 | Ex. 10 | Ex. 11 | Ex. 12 | Ex. 13 |
|---|---|---|---|---|---|---|---|---|
| Metal-containing dye | 8 | 8 | 8 | 8 | 8 | 8 | 4 | 12 |
| Fluorine-containing non ionic surfactant | 1.5 | 1.5 | 0 | 0.5 | 1.0 | 2.0 | 1.5 | 1.5 |
| MEK | 30 | 20 | 50 | 50 | 50 | 50 | 50 | 50 |
| 1,3-Dioxolane | 70 | 80 | 50 | 50 | 50 | 50 | 50 | 50 |
| Ethanol | — | — | — | — | — | — | — | — |
| Acetone | — | — | — | — | — | — | — | — |
| Rapid-drying properties | ○ | Δ | ○ | ○ | ○ | Δ | ○ | ○ |
| Decap time | ○ | ○ | X | ○ | ○ | ○ | ○ | ○ |
| Intermittent long-run printability | ○ | Δ | X | ○ | ○ | ○ | ○ | ○ |

The invention claimed is:

1. An ink-jet ink comprising an organic solvent, a surfactant, and a coloring material, wherein the organic solvent contains 1,3-dioxolane and methyl ethyl ketone, and wherein the mass ratio of 1,3-dioxolane to methyl ethyl ketone is 20:80 to 80:20.

2. The ink-jet ink according to claim 1, wherein the surfactant is a nonionic surfactant.

3. The ink-jet ink according to claim 1, wherein the content of the surfactant is 0.1 to 2 parts by mass based on 100 parts by mass of the organic solvent.

4. The ink-jet ink according to claim 1, wherein the coloring material is a metal-containing dye.

5. The ink-jet ink according to claim 1, wherein the content of the coloring material is 1 to 20 parts by mass based on 100 parts by mass of the organic solvent.

* * * * *